Nov. 21, 1950     B. C. SKINNER     2,531,378
APPARATUS FOR COOKING SOLIDS IN LIQUIDS
Filed Jan. 7, 1948
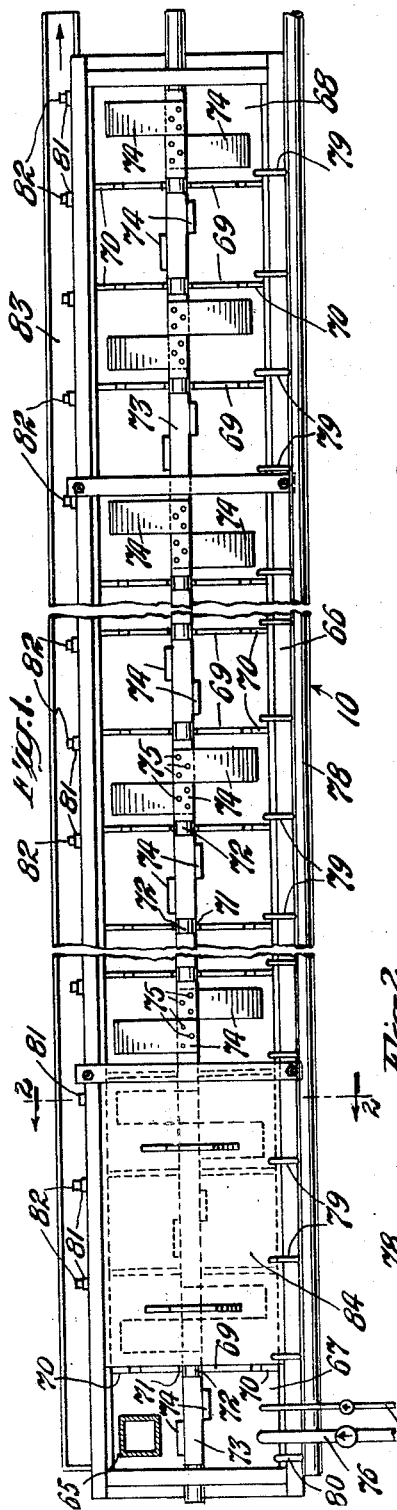
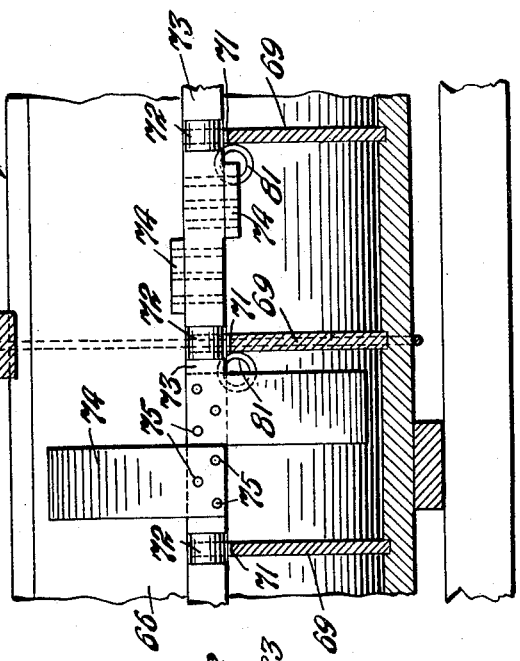
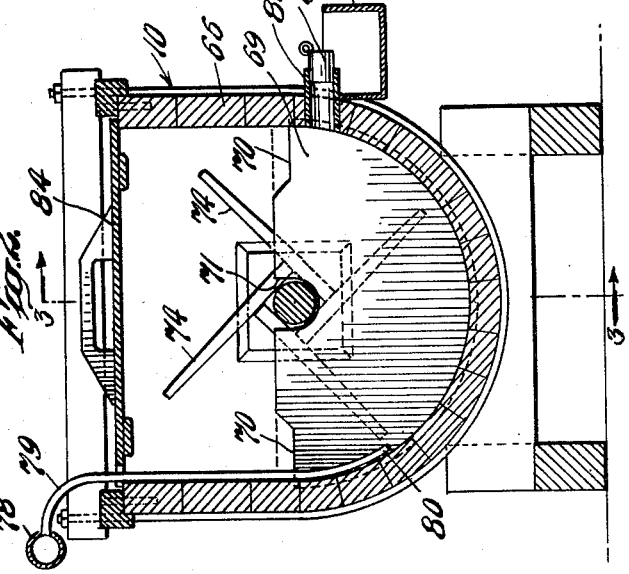
INVENTOR
Bronson C. Skinner
BY
Watson, Bristol, Johnson & Leavenworth
ATTORNEYS Patented Nov. 21, 1950

2,531,378

UNITED STATES PATENT OFFICE 2,531,378

APPARATUS FOR COOKING SOLIDS IN LIQUIDS

Bronson C. Skinner, Dunedin, Fla.

Application January 7, 1948, Serial No. 1,046

3 Claims. (Cl. 99—348)

The present invention relates to apparatus for cooking solids in liquids, such as, for example, citrus fruit peel pieces in water, which may be acidulated, for extraction of pectin from the citrus peel; and the present application contains in part the disclosure of the copending application of Richard C. Nelson, Serial No. 499,088, filed August 18, 1943, which matured December 7, 1948, into Patent No. 2,455,382.

A general object of the present invention is to provide such apparatus which is simply and readily constructed and economically operable to cook a mixture of solids and liquids during continuous flow thereof over a desired or extended cooking period with suitable provision for agitation of the mixture during the cooking thereof.

Another object of the invention is to provide such cooking apparatus which will efficiently perform a certain cooking procedure to obtain from citrus fruit peel an aqueous liquor or extract, preferably acidified, having a relatively high content of pectin which is characterized by cooking a mixture of prepared peel pieces and hot water, preferably containing an acid additive, while continuously traveling along an elongated path to provide a prolonged cooking period without materially interfering with the continuity of the method.

Other objects of the invention will in part be obvious and will in part appear hereinafter.

The invention accordingly comprises the features of construction, combination of elements and arrangement of parts, which will be exemplified in the construction hereinafter set forth, and the scope of the invention will be indicated in the claims.

For a fuller understanding of the nature and objects of the invention, reference should be had to the following detailed description taken in connection with the accompanying drawing, in which:

Fig. 1 is a top plan view, with parts broken away and omitted, of an embodiment of the cooker apparatus of the present invention;

Fig. 2 is an elevational section taken substantially on line 2—2 of Fig. 1, but showing agitator blades thereof in different positions for the purpose of clarity; and Fig. 3 is an enlarged elevational section, with parts broken away, taken substantially on line 3—3 of Fig. 2, but with the agitator blades in the positions shown in Fig. 1.

It will be understood that, although the particular embodiment of the cooker apparatus shown in the drawing was designed for employment in a procedure of making a pectin product, it may be used to advantage in cooking various solids in various liquids, or a variety of admixtures thereof. Referring to the drawing, in which like numerals identify similar parts throughout, it will be seen that the typical embodiment of the cooker apparatus shown therein, and generally identified by the numeral 10, may comprise an elongated, substantially horizontal or laterally-extending, wooden tank or trough 66 which may be about seventy-five feet (75') long and about three feet (3') wide and deep. This elongated tank has a receiving end 67 and a discharge end 68, and is preferably divided into a plurality of compartments by a plurality of partitioning walls 69—69 which may provide compartments about one and one-half feet (1½') long and an equal dimension in depth. The partitions 69—69 are preferably shaped to provide notches 70—70 on both sides of the trough 66 so that a cooking mixture or mash may overflow from compartment to successive compartment. The medial portions of the partitions 69—69 are preferably provided with notches 71—71 each to receive a rounded portion 72 of a longitudinally extending shaft 73.

The shaft 73 may be formed in two pieces with an end of each extending through an end wall of the tank 66 to be driven by suitable means. The shaft 73, between cylindrical portions 72—72, preferably is made square in cross-section to provide for easy mountation of agitator blades 74—74 in each compartment. These blades 74—74, as shown in Figs. 2 and 3, may each be readily mounted to a face of the shaft 73 by means of pins 75—75.

At the intake end 67 of the cooker 10 a water supply pipe 76 and an acid supply pipe 77 are provided continuously to supply metered amounts of hot water and acid to the first compartment there to be mixed with the peel shreds dumped through a supply or scale discharge chute 65.

Heat is to be supplied to the mixture as it is flowed along the trough 66 from the intake end 67 to the discharge point and this may be accomplished in any of a number of well known ways. However, it is preferred to provide a steam pipe 78 fitted with a plurality of conduits 79, each leading down into one of the successive compartments and terminating in a nozzle 80 below the overflow notch 70 to provide a submerged steam jet. A gated discharge opening is provided for each compartment so that the length of travel of the mash through the cooker may be selected or altered at will. These discharge means may comprise gated or plugged openings in the bottom of the compartments but, as shown in Figs. 1, 2 and 3, preferably comprise discharge tubes 81—81 let in through the side wall of the tank 66. Each discharge tube 81 may be closed by any suitable means, such as by a plug 82, and an inclined trough 83 is mounted below the outer ends of the discharge tubes 81—81 to receive cooked mash from any selected one thereof for delivery to any suitable apparatus. Cover sections 84—84 are preferably provided to cover the entire tank except the first compartment at the receiving end 67.

In operation, the cooker 10 periodically, say every minute or two, receives from an automatic scales through supply chute 65 a measured charge of prepared peel shreds, and a metered amount of hot water and acid, such as hydrochloric acid, through pipes 76 and 77. These materials are mixed together in the first compartment at the receiving or intake end 67 by agitators 74—74 and further by turbulence produced by a submerged steam jet coming from the nozzle 80 therein. These materials are partially cooked therein and as the materials fill the first compartment up to the level of notches 70, 70 further addition of materials causes an over-flow into the second compartment. Continual addition to the first compartment causes the fed materials to collect in each compartment and overflow from compartment to successive compartment and to cook therein to produce a viscous mash which is drawn off at a selected point of discharge through a selected discharge pipe 81. Such mash movement is assured, either by elevating the intake end 67 slightly above the discharge end 68, or by forming the bottoms of notches 70—70 in the successive partitions 69—69 at progressively lower levels. The variation in the length of path along which the viscous mash flows through the cooker 10 accomplishes a variation in the cooking period of time. Cooking of a typical run may be performed at a temperature between about seventy and eighty degrees centigrade (70°–80° C.) for about one hour (1 hr.) with substantially constant agitation of the viscous mash.

In a typical cooking apparatus where the trough has a constant capacity, if the rate of introduction of cooking liquid and solids be increased or decreased the time during which any particular portion of the mixture is in the trough and cooked during its passage therethrough will be correspondingly decreased or increased. If a particular rate of feed of materials into the first compartment is maintained, increasing or decreasing the number of compartments in actual use will lengthen or shorten the cooking period. This makes it possible, either by adjusting the length of the path of travel or the rate of feed, to adjust the cooking time to an optimum value which optimum during continuous operation may vary. This optimum may be recognized by the employment of viscosity measurements of the mash in the cooker and adjustments can be made accordingly. Citrus fruit peel of differing characteristics will require different conditions in the cooker. For example, a relatively hard peel will dictate the employment of relatively high cooking temperatures and less acidity while a softer peel will dictate the use of relatively lower cooking temperatures and higher acidity.

It will thus be seen that the objects set forth above and those made apparent in the preceding description are efficiently attained and, since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Apparatus for cooking solids in liquids comprising, in combination, an elongated structure having an intake end and a point of discharge distant therefrom, a plurality of partitioning means dividing said structure into a series of successively arranged compartments with each being so constructed as to provide for overflow passage of flowing mixture from compartment to successive compartment at certain levels, means to supply solids and cooking liquid at the intake end to cause a mixture thereof successively and progressively to collect in and overflow from compartment to compartment of the series thereof for substantially continuous passage through the structure during a prolonged cooking period, means in each compartment to agitate the mixture collected therein, and means in each compartment to supply heat to the mixture collected and agitated therein.

2. Apparatus for cooking solids in liquids comprising, in combination, an elongated structure having an intake end and a point of discharge distant therefrom, a plurality of partitioning means dividing said structure into a series of successively arranged compartments with each being so constructed as to provide for passage of flowing mixture from compartment to successive compartment at certain levels, means to supply solids and cooking liquid at the intake end to cause a mixture thereof to flow substantially continously through said structure for a prolonged cooking period, mechanical means in each compartment to agitate the mixture therein, a gated outlet for each compartment to permit variation at will of the length of the path of flow, and means to provide at least one steam jet in each compartment below the level at which the mixture is to collect therein.

3. In apparatus of the kind described, in combination, an elongated liquid retaining structure including side walls and having an intake end and a discharge end, means for introducing liquid and floatable solids at said intake end, means for discharging a floatable solid-liquid mixture at the discharge end, spaced transverse partitions dividing the lower portion of said structure into compartments, said partitions terminating short of the high points of the side walls, each partition including an upper edge having low and high portions, said low portions of said partitions providing overflow areas for liquid and floatable solids in said structure, said low portions being at successively lower levels relative to a horizontal plane from intake end to discharge end of said structure to insure flow of liquid and floatable solids successively over said low portions after entry at the intake end, agitating means disposed in each compartment, means for activating said agitating means, and means in each compartment for heating liquidized material therein.

BRONSON C. SKINNER.

REFERENCES CITED

The following references are of record in the file of this patent:

UNITED STATES PATENTS

| Number | Name | Date |
|---|---|---|
| 154,312 | Woolner | Aug. 18, 1874 |
| 1,877,010 | Miscampbell | Sept. 13, 1932 |
| 2,029,691 | Robinson | Feb. 4, 1936 |
| 2,455,382 | Nelson | Dec. 7, 1948 |